(12) United States Patent
Higuchi

(10) Patent No.: US 8,755,457 B2
(45) Date of Patent: Jun. 17, 2014

(54) TRANSMITTER AND MIMO MULTIPLEX TRANSMISSION METHOD

(75) Inventor: Kenichi Higuchi, Saitama (JP)

(73) Assignee: NTT DoCoMo, Inc, Tokyo (JP)

( * ) Notice: Subject to any disclaimer, the term of this patent is extended or adjusted under 35 U.S.C. 154(b) by 0 days.

(21) Appl. No.: 13/521,453

(22) PCT Filed: Jan. 13, 2011

(86) PCT No.: PCT/JP2011/050405
§ 371 (c)(1),
(2), (4) Date: Aug. 2, 2012

(87) PCT Pub. No.: WO2011/087039
PCT Pub. Date: Jul. 21, 2011

(65) Prior Publication Data
US 2012/0307937 A1    Dec. 6, 2012

(30) Foreign Application Priority Data

Jan. 13, 2010  (JP) ................................ 2010-004937
Jun. 9, 2010   (JP) ................................ 2010-132421

(51) Int. Cl.
*H04L 27/00*  (2006.01)

(52) U.S. Cl.
USPC ....................................................... 375/299

(58) Field of Classification Search
CPC .. H04L 27/2618; H04L 43/0852; H04L 45/28
See application file for complete search history.

(56) References Cited

U.S. PATENT DOCUMENTS

2005/0265479 A1* 12/2005 Fujii et al. ..................... 375/303
2009/0307558 A1* 12/2009 Lee et al. ...................... 714/749

OTHER PUBLICATIONS

Schurgers et al., A Systematic Approach to Peak-to-Average Power Ration in OFDM, University of California at Los Angeles, 2001.*
Schurgers et al., A System Approach to Peak-to-Avearage Power Ratio in OFDM, 2001, University of California at Los Angeles.*
International Search Report w/translation from PCT/JP2011/050405 dated Apr. 19, 2011 (4 pages).
Iwasaki, Masao, et al.; "Clipping and Filtering-Based PAPR Reduction Method for Precoded OFDM-MIMO Signals"; IEICE Technical Report, vol. 109, No. 369, pp. 7-12; Jan. 14, 2010 (7 pages).
Iwasaki, Masao et al.; "Clipping and Filtering-Based PAPR Reduction Method for Precoded OFDM-MIMO Signals"; Cehivular Technology Conference, 2010 IEEE 71st; May 16, 2010 (6 pages).
3GPP TS 36.300 V8.10.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Sep. 2009 (147 pages).

* cited by examiner

*Primary Examiner* — Chieh M Fan
*Assistant Examiner* — Wednel Cadeau
(74) *Attorney, Agent, or Firm* — Osha Liang LLP

(57) ABSTRACT

In MIMO multiplex transmission accompanied by precoding, a reduction of peak power is realized while minimizing deterioration of transmission quality. The present MIMO multiplex transmission method includes a step of generating transmission data corresponding to a plurality of streams to be transmitted simultaneously, a step of performing precoding so that the transmission data is received by a receiver as data orthogonal to each other, a step of applying amplitude clipping to the precoded transmission data in stream units to suppress peaks of the entire transmission power, and a step of suppressing allocation of interference power caused by the amplitude clipping to streams in a good channel state.

5 Claims, 9 Drawing Sheets

# TRANSMITTER AND MIMO MULTIPLEX TRANSMISSION METHOD

TECHNICAL FIELD

The present invention relates to a transmitter and a MIMO multiplex transmission method to which OFDM MIMO multiplexing is applied.

BACKGROUND ART

OFDM (Orthogonal Frequency Division Multiplexing) is considered as a promising radio access scheme among future mobile communication schemes capitalizing on the advantages such as reduced symbol rates through multicarrier transmission, high resistance to interference from delayed waves with the addition of a CP (Cyclic Prefix) in a multipath environment and a high degree of adaptability to a variety of signal bandwidths, and has already been adopted for LTE (Long Term Evolution) which is a long-term advanced system of a third generation mobile communication system in 3GPP (3rd Generation Partnership Project) (e.g., see Non-Patent Literature 1). However, since an OFDM signal is a multicarrier signal, there is a problem that a PAPR (Peak-to-Average Power Ratio) increases. An increase in the PAPR results in a problem that average transmission power decreases when there are constraints on peak transmission power.

Various methods have been proposed so far as a PAPR suppressing method in OFDM. One of a PAPR suppression methods without requiring side information is a method based on clipping and filtering (CF). The CF method is a method performing amplitude clipping on an OFDM time signal and then removing out-of-band interference caused by the clipping using a filter.

On the other hand, space division multiplexing using a MIMO (Multiple-Input Multiple-Output) channel (hereinafter referred to as "MIMO multiplexing") can be expected to drastically improve frequency utilization efficiency. A combination of OFDM and MIMO multiplexing holds great promise for future radio communication systems. MIMO multiplexing using precoding based on SVD (Singular Value Decomposition) of a channel matrix in particular (hereinafter referred to as "specific mode MIMO transmission") is known as a method for realizing maximum channel capacity.

CITATION LIST

Non-Patent Literature

[Non-Patent Literature 1]: 3GPP TS36.300, Evolved Universal Terrestrial Radio Access (E-UTRA) and Evolved Universal Terrestrial Radio Access Network (E-UTRAN); Overall description.

SUMMARY OF THE INVENTION

Technical Problem

However, when the CF method is applied to MIMO multiplex transmission using precoding, performing clipping and filtering at each transmitting antenna branch end produces interference caused by equivalently adding a peak suppression signal to each stream before precoding, resulting in a problem that channel capacity deteriorates.

The present invention has been implemented in view of the above circumstances, and it is an object of the present invention to provide a transmitter and a MIMO multiplex transmission method capable of minimizing deterioration of channel capacity caused by interference caused by a peak suppression signal in OFDM MIMO multiplex transmission accompanied by precoding.

Solution to Problem

A transmitter of the present invention includes transmission data generating section configured to generate transmission data simultaneously transmitted in a plurality of streams, precoding section configured to perform precoding so that the transmission data is received by a receiver as data orthogonal to each other, peak suppressing section configured to apply amplitude clipping to the precoded transmission data in stream units to suppress peaks of entire transmission power and interference allocation controlling section configured to suppress allocation of interference power caused by the amplitude clipping to streams in a good channel state.

Thus, in MIMO multiplex transmission, interference mainly caused by clipping is intensively distributed to streams in a poor state whose capacity reduction by interference is small, and it is thereby possible to reduce overall capacity loss.

Technical Advantages of the Invention

According to the present invention, it is possible to minimize deterioration of channel capacity caused by interference caused by a peak suppression signal in OFDM MIMO multiplex transmission accompanied by precoding.

DESCRIPTION OF EMBODIMENTS

The present invention is applicable to an arbitrary precoding technique, and the following description will describe a case where the present invention is applied to specific mode MIMO multiplex transmission.

Figure 1:
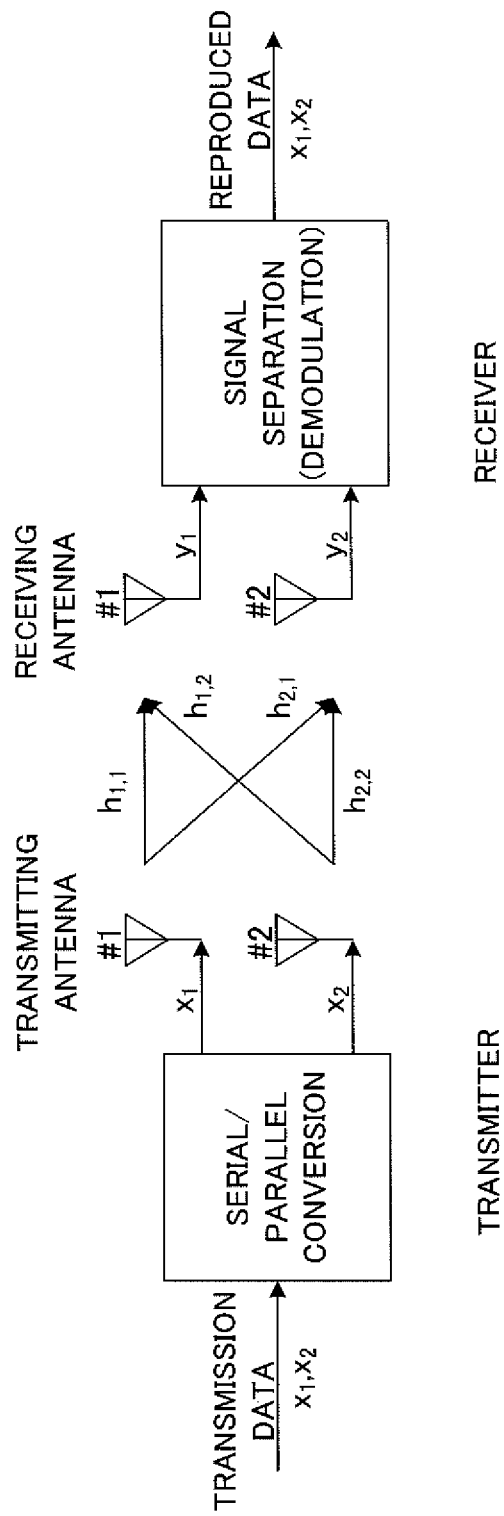
FIG. 1 is a diagram illustrating the principle of MIMO multiplexing.

FIG. 1 is a diagram illustrating the principle of MIMO multiplexing and shows an example of 2×2 MIMO multiplexing.

A transmitter and a receiver are each provided with a plurality of antennas, and FIG. 1 shows a method for simultaneously transmitting as many information symbols as antennas. The transmitter converts transmission data ($x_1, x_2 \ldots$) from serial to parallel, transmits information symbol $x_1$ from one transmitting antenna #1 and transmits information symbol $x_2$ from the other transmitting antenna #2 simultaneously. The receiver receives received signal $y_1$ by one receiving antenna #1 and receives received signal $y_2$ by the other receiving antenna #2. In this case, the received signals $y_1$ and $y_2$ can be expressed by the following expression:

$$y_1 = h_{1,1}x_1 + h_{1,2}x_2 + w1$$

$$y_2 = h_{2,1}x_1 + h_{2,2}x_2 + w2$$

where, w1 and w2 are noise terms (components), $h_{1,1}$ and $h_{1,2}$ represent channels from the transmitting antennas #1 and #2 to the receiving antenna #1, and $h_{2,1}$ and $h_{2,2}$ represent channels from the transmitting antennas #1 and #2 to the receiving antenna #2.

If the noise terms (w1, w2) are ignored, $y_1$ and $y_2$ are simultaneous equations with respect to variables $x_1$ and $x_2$, and it is thereby possible to demodulate two information symbols simultaneously by solving the above simultaneous equations through signal separation.

Consider MIMO multiplexing with $N_{tx}$ transmitting antenna branches and $N_{rx}$ receiving antenna branches. Suppose the number of spatially multiplexed streams L is $N_{tx}$. However, of the L ($=N_{tx}$) streams, it is only $N_{min}=\min(N_{tx}, N_{rx})$ or fewer streams that actually contribute to information transmission. Assuming that the number of subcarriers is K and the number of FFT points is F, a frequency domain OFDM transmission symbol vector $c_l$ of a first ($1 \leq l \leq L$) stream having a length of F is expressed by following equation (1).

[Equation 1]

$$c_l = \begin{bmatrix} c_{eff,l} \\ 0 \end{bmatrix}, c_{eff,l} \in c^K \quad (1)$$

where, $c_{eff,l}$ is a transmission symbol vector of an effective subcarrier having a length of K. By executing IFFT with F points on $c_l$, a time domain signal vector $x_l^{(b)}$ of the first stream having a length of F is obtained.

[Equation 2]

$$x_l^{(b)} = \mathrm{IFFT}_F(c_l) \quad (2)$$

Here, to measure sufficiently accurate peak power, F must be a value approximately four times K or more. A frequency non-selective fading channel is assumed for simplicity. If a channel matrix H is expressed by an identical $N_{rx} \times N_{tx}$ matrix for all subcarriers, H is expressed by equation (3) through singular value decomposition.

[Equation 3]

$$H = U\Lambda V^* \quad (3)$$

Here, U is a unitary matrix of $N_{rx} \times N_{rx}$ in size, V is a unitary matrix of $N_{tx} \times N_{tx}$ in size and $\Lambda$ is the following matrix of $N_{rx} \times N_{tx}$ in size with the respective diagonal components made up of non-negative real numbers representing singular value $\lambda l$ of the first stream. "*" denotes a complex conjugate.

[Equation 4]

$$\Lambda = \begin{bmatrix} \Sigma & 0 \\ 0 & 0 \end{bmatrix}, \Sigma = \mathrm{diag}\{\lambda_l\} \quad (4)$$

where, $\Sigma$ is a diagonal matrix of $N_{min} \times N_{min}$ in size. $\lambda_l$ corresponding to 1, greater than $N_{min}$ is 0 and further $\lambda_l \geq \lambda_{l+1}$ is also assumed. Through precoding using V in the transmitter and linear filtering using U* in the receiver, the MIMO channel is converted to L parallel channels. That is, specific mode MIMO transmission is realized.

Figure 2:
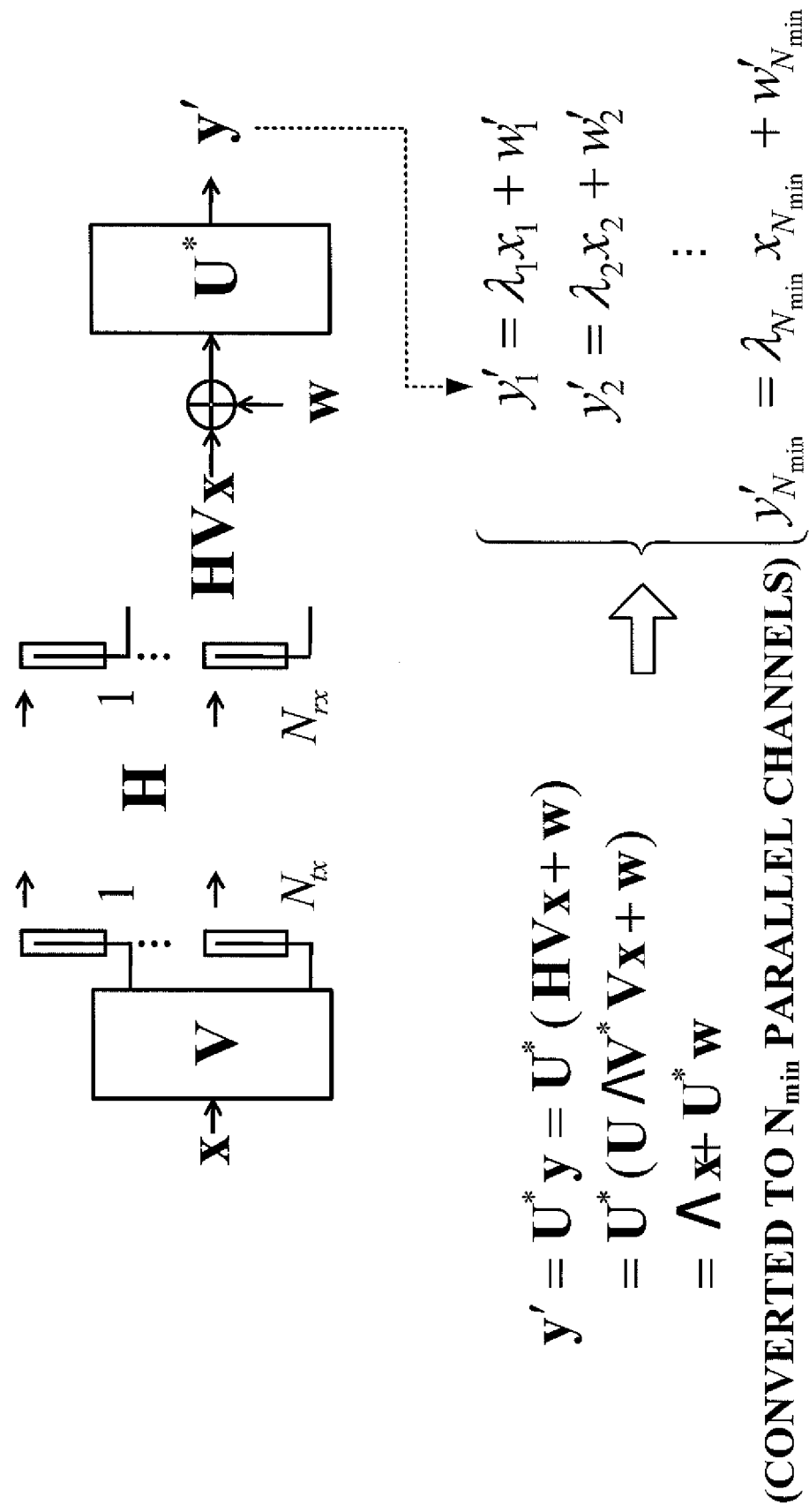
FIG. 2 is a conceptual diagram of specific mode MIMO multiplex transmission.

The specific mode MIMO multiplex transmission will be described more specifically with reference to FIG. 2.

In the specific mode MIMO multiplex transmission, the transmitter performs precoding using the unitary matrix V of $N_{tx} \times N_{tx}$ for a transmission signal vector x and the receiver multiplies the received signal y by the unitary matrix U of $N_{rx} \times N_{rx}$ and performs post-decoding. That is, the transmitter transmits Vx instead of the transmission signal vector x and Vx is received by $N_{rx}$ receiving antennas of the receiver via a channel represented by a channel matrix H. The receiver multiplies the received signal represented by HVx by a Gaussian noise vector w ($N_{rx} \times 1$), multiplies this received signal vector y($=Hx+w$) by U* and performs post-decoding. As a result, the channel is converted to $N_{min}$ ($y'_1$ to $y'_{Nmin}$) parallel channels.

Transmission power distribution to L streams based on a water filling principle is performed using singular value $\lambda_l$. Power $p_l$ allocated to the first stream is determined as follows.

[Equation 5]

$$P_l = \left(w - \frac{N_0}{|\lambda_n|^2}\right)^+ \quad (5)$$

where function $(a)^+$ takes value a when a is a positive number, and is 0 when a is a negative number. $N_0$ represents noise power and w is determined so that the total value of $p_l$ becomes equal to maximum available transmission power P. A transmission signal vector $x_l$ of the first stream after transmission power is controlled is expressed by following equation (6).

[Equation 6]

$$x_l = \sqrt{P_l} x_l^{(b)} \quad (6)$$

In this transmission power allocation, transmission power may not be allocated to several streams depending on the channel state. In this case, the effective number of streams becomes smaller than $N_{min}$.

When Y is assumed to be a transmission signal matrix of $N_{tx} \times F$ in size representing a signal whose (t, i) component is transmitted at an i-th discrete time from a t-th transmitting antenna branch, Y is given by following equation (7).

[Equation 7]

$$Y = V[x_1^t \ldots x_L^t]^t \quad (7)$$

Hereinafter, $y_i$ is assumed to be an i-th ($1 \leq I \leq F$) column vector of Y and $x_i$ is an i-th column vector of $[x_1^t \ldots x_L^t]^t$. The total channel capacity when the CF method is not applied to Y is expressed as follows:

[Equation 8]

$$c = \sum_{l=1}^{L} \log_2\left(1 + \frac{p_l|\lambda_l|^2}{N_0}\right) \quad (8)$$

When the CF method is simply applied to specific mode MIMO transmission, clipping and filtering are performed on the transmission signal matrix Y, and an output signal is transmitted.

Since an interference signal for peak suppression is produced by clipping and filtering, y~i ("~" is a replacement of an upper bar wave line above y and represents tilde {y} and the same applies to x) which is $y_i$ after PAPR suppression using the CF method is expressed by following equation (9).

[Equation 9]

$$\tilde{y}_i = y_i + \Delta_i \quad (9)$$

where, $\Delta_i$ is a vector having a length of $N_{tx}$ representing interference caused by clipping and filtering. This means that the transmission signal xi before precoding is converted to x~i expressed by following equation (10).

[Equation 10]

$$\tilde{x}_i = V^*\tilde{y}_i = x_i + V^*\Delta_i = x_i + e_i \quad (10)$$

where, $e_i = [e_{1,i}, \ldots, e_{L,i}]^t$ is an interference vector observed in each stream at an i-th discrete time. Therefore, the total channel capacity is expressed by following equation (11).

[Equation 11]

$$c_{cf} = \sum_{l=1}^{L} \log_2\left(1 + \frac{p_l|\lambda_l|^2}{|\lambda_l|^2 E_i[|e_{L,i}|^2] + N_0}\right) \quad (11)$$

where, $E_i[|e_{l,i}|^2]$ represents an average value of $|e_{l,i}|^2$ with respect to i and $|\lambda_l|^2 E_i[|e_{l,i}|^2]$ represents the magnitude of interference power added to the stream l. Therefore, equation (11) indicates that capacity loss caused by interference using the CF method increases for a stream having greater $\lambda_l$ and greater $p_l$.

Figure 3:
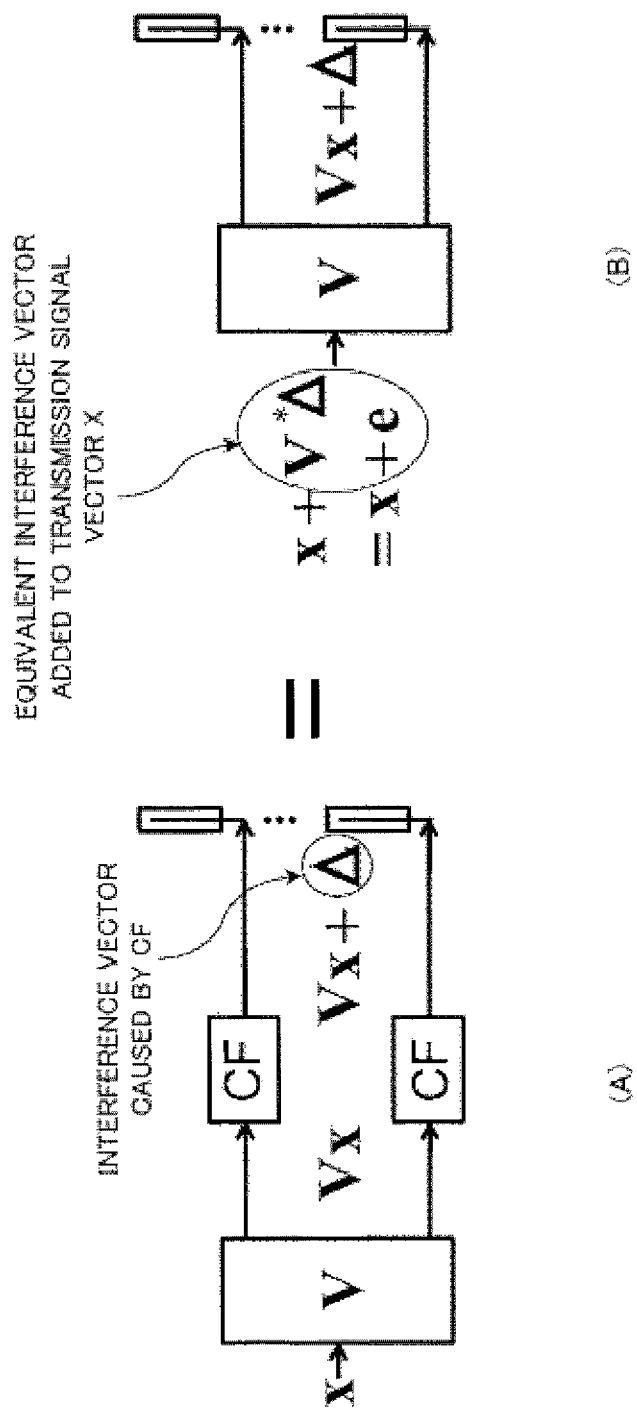
FIG. 3 is a conceptual diagram illustrating that in-band interference is equivalently distributed among streams.

FIGS. 3(A) and (B) are conceptual diagrams showing that in-band interference is equivalently distributed among streams by applying the CF method at each transmitting antenna end. As shown in FIG. 3(A), by applying the CF method at each transmitting antenna end of the transmitter, an interference vector $\Delta$ generated using the CF method is added to each stream, causing each stream to become Vx+$\Delta$. This is equivalent to that an equivalent interference vector $V^*\Delta$ is added to the transmission signal vector x as shown in FIG. 3(B).

As a result of the above study, the present inventor has come up with the present invention by discovering that deterioration of channel capacity can be suppressed if interference caused by clipping and filtering can be concentrated on streams having relatively small $\lambda_l$ or $p_l$.

Here, suppose the number of streams having $p_l$ which is greater than 0 is $L_{eff}$. In this case, if $L_{eff}$ is assumed to be smaller than L, by causing interference caused by clipping and filtering in each stream to be concentrated on the ($L_{eff}$+1)-th to L-th streams, PAPR can be suppressed without deterioration of the channel capacity. This is understandable from the fact that streams having $p_l$ which is greater than 0 represent effectively transmitted streams (that contribute to an increase of channel capacity) among all streams as is clear from equation (5). Suppose the ($L_{max}$=L) states is worsened as the stream number increases. When $L_{eff}$ is equal to L, a certain degree of deterioration of channel capacity needs to be tolerated, but deterioration of channel capacity can be expected to be reduced compared to the conventional CF method by allocating greater interference power to streams having smaller $\lambda_l$.

Here, when $L_{eff}$ is equal to L, suppose the $L_{eff}$-th stream having the smallest $\lambda_l(p_l)$ is used for PAPR suppression. Summarizing all the observations described above, the number of streams $L_{pr}$ that do not tolerate interference is defined as follows.

[Equation 12]

$$L_{pr} = \begin{cases} L_{eff}, & \text{if } L_{eff} < L \\ L_{eff} - 1, & \text{otherwise} \end{cases} \quad (12)$$

The present invention performs control so that interference caused by clipping and filtering for peak suppression is concentrated on the $L_{pr+1}$-th to L-th streams which are streams in a poor state whose capacity reduction by interference is small and thereby reduces the overall capacity loss.

To be more specific, interference is concentrated on streams corresponding to (1) and (2) below among $N_{tx}$ streams in total.

(1) When there are streams where $\lambda_l$=0, all those streams (Since, $N_{tx} > N_{rx}$, this holds true when $N_{min} < N_{tx}$, ($N_{min}$+1)-th to $N_{tx}$-th streams correspond to this)

(2) When there is no stream where $\lambda_l$=0, $N_{min} = N_{tx}$-th stream where $\lambda_l$ is minimum (Since $N_{tx} \leq N_{rx}$, this holds true when $N_{min} = N_{tx}$.)

Figure 4:
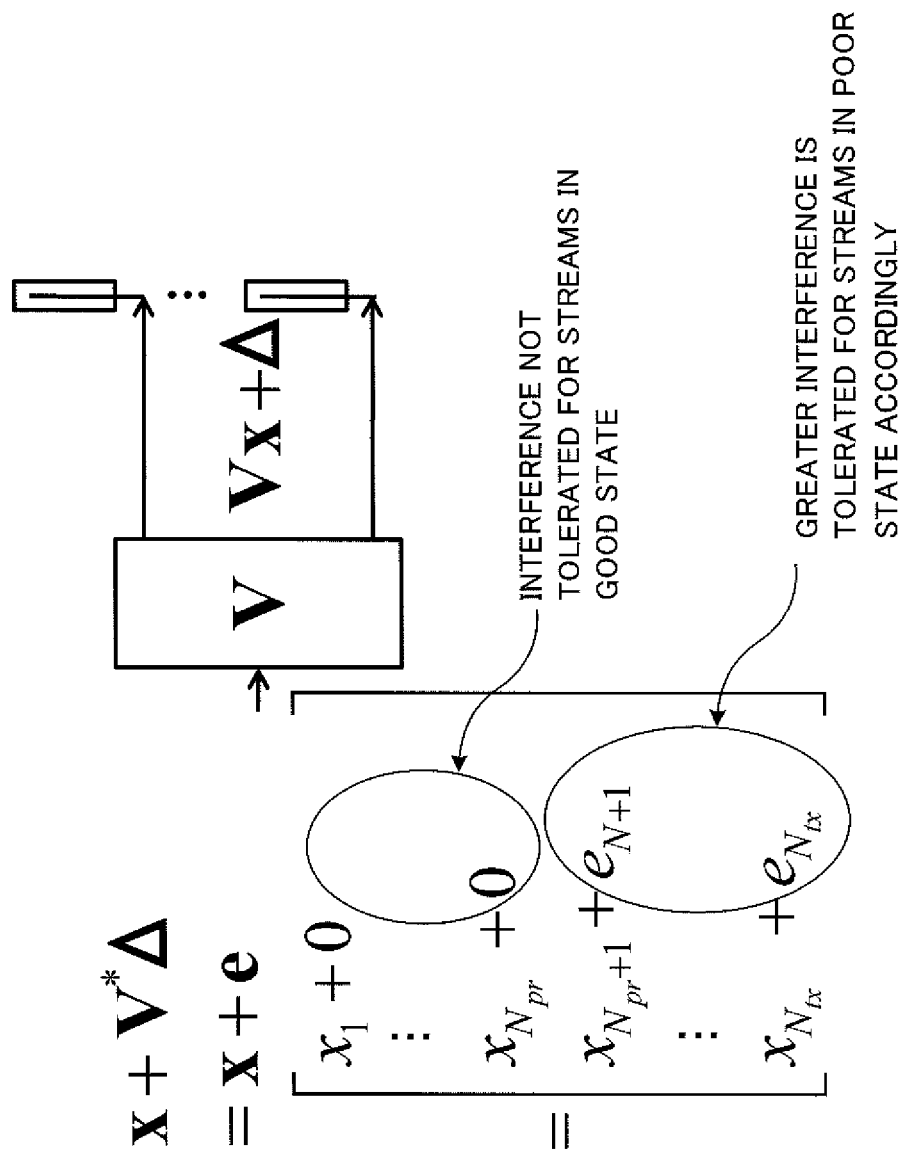
FIG. 4 is a conceptual diagram of a concentrated arrangement of interference components of the present invention.

FIG. 4 shows a conceptual diagram of a concentrated arrangement of interference components according to the present invention. In FIG. 4, the number of streams that do not tolerate interference is assumed to be $N_{pr}$ and e is an interference component. As shown in FIG. 4, in streams of stream numbers 1 to $N_{pr}$ that do not tolerate interference, the interference component e added to the transmission signal vector x is 0. On the other hand, the interference component e is added in a concentrated manner to streams of stream numbers $N_{pr+1}$ to $N_{tx}$ that tolerate interference in a poor state.

Figure 5:
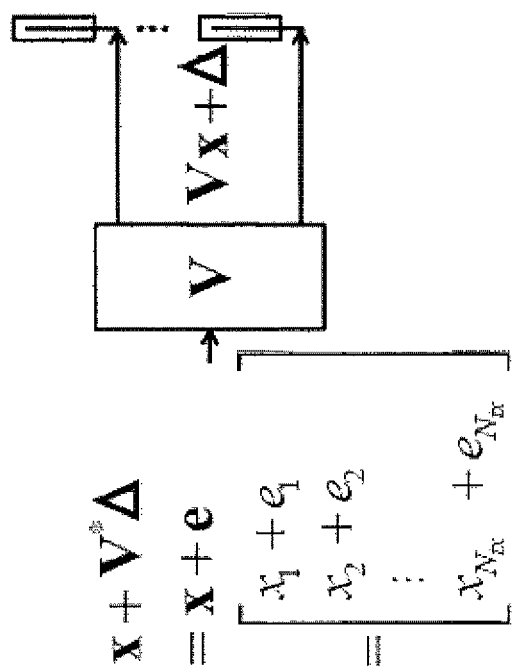
FIG. 5 is a conceptual diagram in a case where interference components generated by a CF method are uniformly distributed to streams.

FIG. 5 is a conceptual diagram when interference components using the CF method are uniformly distributed among streams. The interference components are uniformly distributed among all streams. Therefore, interference components are added even to streams of stream numbers 1 to $N_{pr}$ which are in a good state.

The problem of determining an optimum peak suppression signal e in the present invention is described in the following convex optimization problem including constraint a), constraint b) and constraint c).

[Equation 13]

minimize $P_{max}$ subject to $|\tilde{y}_{t,i}|^2 < P_{max}$, $i=1, \ldots, F, t=1, \ldots, N_{tx}$ constraint a)

where $\tilde{y}_i = V(x_i + e_i)$ $z_{t,i} = 0, I = K+1, \ldots, F, t = 1, \ldots, N_{tx}$, constraint b)

where $z_t = FFT_F([\tilde{y}_{t,1} \ldots, \tilde{y}_{t,F}]^t)$ $e_{l,i} = 0, i=1, \ldots, F, l=1, \ldots, L_{pr}$ constraint c) $\quad (13)$ where, $P_{max}$ is peak power and minimize $P_{max}$ means that peak power is minimized. y~$_{t,i}$ is a transmission signal of an i-th time sample of the t-th transmitting antenna after peak suppression. F is the number of FFT points and represents the number of subcarriers including an out-of-band range. K is the effective number of subcarriers. $z_{t,i}$ represents a transmission signal of an i-th subcarrier of the t-th transmitting antenna after peak suppression and $e_{l,i}$ represents an interference signal added to the t-th stream in the i-th time sample.

The constraint a) is a constraint on suppression of peak power and is a condition that "all transmission signal power of each time sample is equal to or lower than peak power."

The constraint b) is a constraint regarding removal of out-of-band interference and is a condition that "out-of-band interference is set to 0."

The constraint c) is a constraint that guarantees that interference is not allocated to streams in a good state and is a condition that interference e with streams of stream numbers 1 to Npr is set to 0."

Since the above equation (13) is a convex optimization problem, an approximate solution can be obtained through execution of consecutive clipping and filtering processing using the CF method (application of constraints a) and b)), application of constraint c) and a repetition algorithm.

The present invention generates a transmission signal vector after peak suppression so that interference caused by CF processing is concentrated on streams in a poor state whose capacity reduction caused by the interference is small in following step 1) to step 6) according to a repetition algorithm.

Step 1) Initialization

In initialization, j is assumed to be 1 (j:=1).

A transmission signal $x_i$ is generated from a frequency domain OFDM transmission symbol vector $c_l$ of the first stream and allocation power $p_l$ of the first stream.

$x_i$ is assumed to be $\hat{x}_i^{(j)}$ ($\hat{x}$ is a replacement of x hat, and represents hat{x}, and the same applies to $\hat{y}$) ($\hat{x}_i^{(j)}:=x_i$).

Step 2) Precoding

Precoding is performed using a unitary matrix V ($\hat{y}_i^{(j)}:=V\hat{x}_i^{(j)}$).

Step 3) Clipping and Filtering

Clipping is performed on $\hat{y}^{(j)}$ ((i=1, ..., F.)).

Filtering is performed on the clipped signal. Here, filtering for removing out-of-band radiation by clipping is performed by transforming the clipped time domain signal into a frequency domain signal through FFT and setting the frequency component corresponding to the out-of-band range of the signal to 0.

The i-th clipped and filtered transmission signal vector is expressed as follows.

$$y^{to}_i{}^{(j)} = \hat{y}_i^{(j)} + \Delta_i^{(j)}$$

Step 4) Calculation of Equivalent Stream Signal Subjected to Clipping and Filtering $V^* y^{to}_i{}^{(j)}$ is calculated for the equivalent stream signal ($\tilde{x}_i^{(j)}:=V^* y^{to}_i{}^{(j)}$).

Step 5) Removal of Interference Components of Streams of Stream Numbers 1 to $L_{pr}$ The interference components in the streams of stream numbers 1 to $L_{pr}$ are removed according to equation (14).

[Equation 14]

$$\hat{x}_i^{(j+1)} := \begin{bmatrix} I_{L_{pr}} & 0 \\ 0 & 0 \end{bmatrix} X_i + \begin{bmatrix} 0 & 0 \\ 0 & I_{L-L_{pr}} \end{bmatrix} \tilde{x}_i^{(j)} \quad (14)$$

where, $I_m$ is a unit matrix of m×m in size.

Step 6) Repetition Returning to Step 2)

The above process is continued until the peak power becomes sufficiently small or until the repetition count exceeds a maximum allowable value. In the last repetition, generated in step 3) is actually transmitted.

Figure 6:
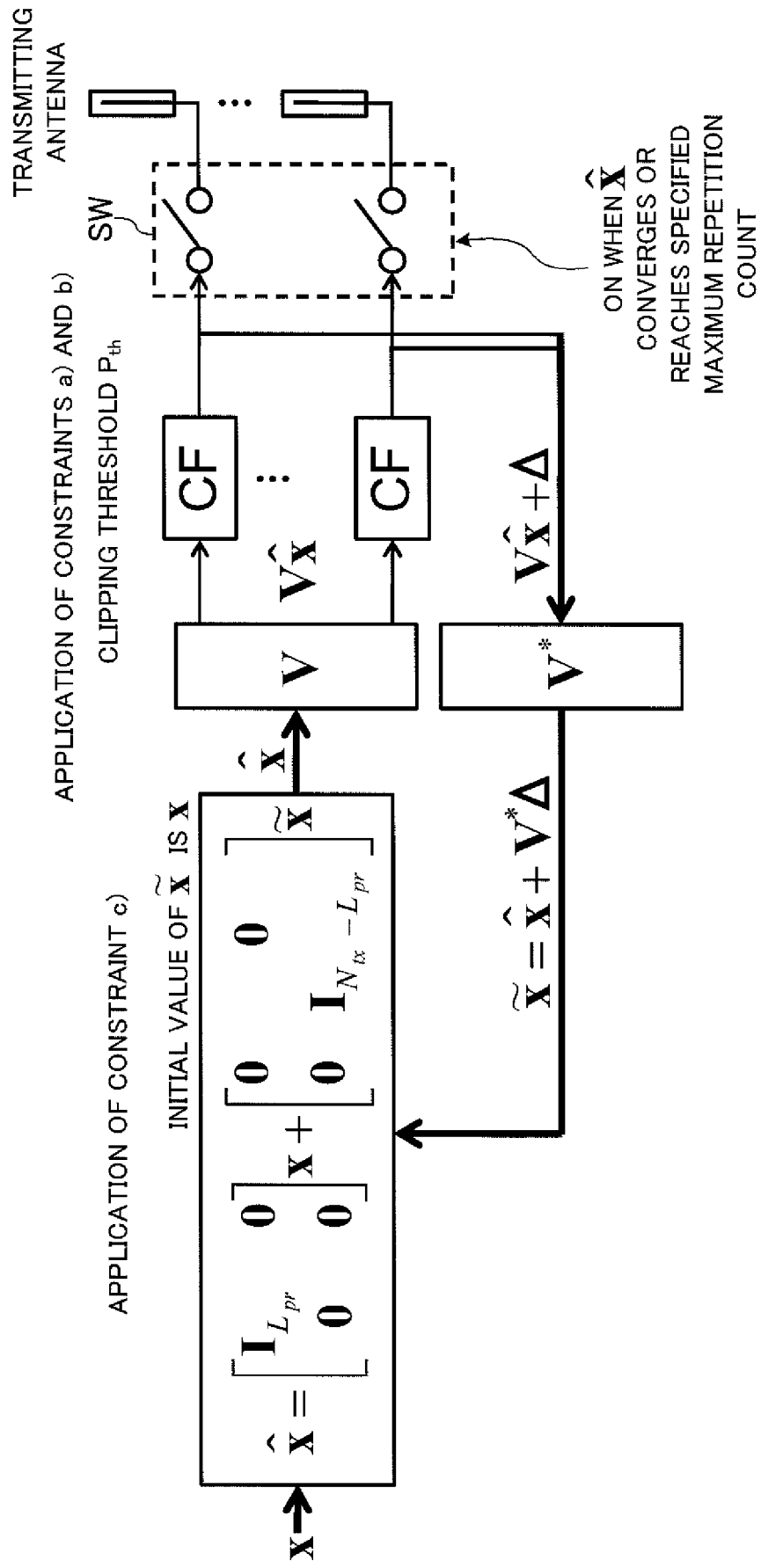
FIG. 6 is a conceptual diagram of a peak suppression method in specific mode MIMO multiplex transmission to which constraints a), b) and c), and a repetition algorithm are applied.

FIG. 6 is a conceptual diagram of a peak suppression method in specific mode MIMO multiplex transmission to which the above constraints a), b) and c), and the repetition algorithm are applied. As shown in FIG. 6, precoding is performed on the transmission signal vector $\hat{x}$ using a unitary matrix V of $N_{tx} \times N_{tx}$. Next, the precoded signal $V\hat{x}$ is subjected to amplitude clipping for cutting amplitude that exceeds a threshold Pth and out-of-band interference caused by clipping is then removed using a filter (constraints a) and b)).

The clipped and filtered transmission signal vector $V\hat{x}+\Delta$ is multiplied by $V^*$ to calculate a clipped and filtered equivalent stream signal ($\tilde{x}$). To satisfy the constraint c), the transmission signal vector $\hat{x}$ is calculated by substituting the equivalent stream signal ($\tilde{x}$) into equation (14). According to equation (14), the interference components are distributed in such a way that distribution of the interference components to streams of stream numbers 1 to $L_{pr}$ in a good state is avoided, and the interference components are concentrated on streams in a band state of stream number $L_{pr+1}$ to L.

The above processing is repeated and when the transmission signal vector $\hat{x}$ converges or the repetition count reaches a predetermined count, the switch SW is turned on to transmit the signal from the transmitting antenna.

Hereinafter, a specific embodiment will be described with reference to FIG. 7.

Figure 7:
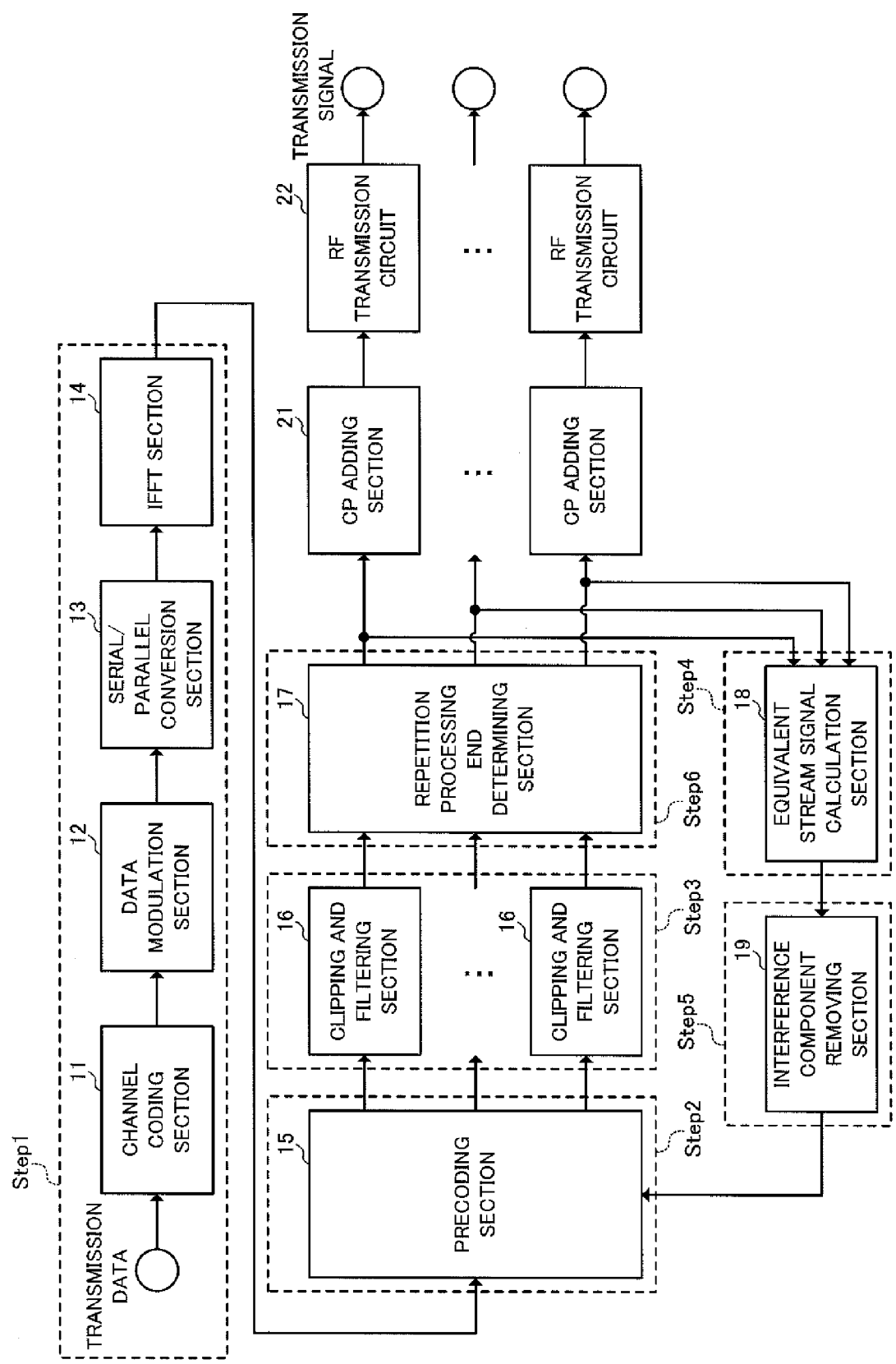
FIG. 7 is a function block diagram of a transmitter according to an embodiment.

FIG. 7 shows function blocks of a transmitter according to an embodiment and assigns step numbers to the function blocks corresponding to the aforementioned steps 1) to 6). In the transmitter shown in FIG. 7, a channel coding section 11 applies processing such as error correction to transmission data to perform channel coding, and a data modulation section 12 applies predetermined data modulation, and a serial/parallel conversion section 13 converts a symbol sequence of the resulting transmission data from serial to parallel. The parallel data is inputted to an IFFT section 14 and collectively transformed into a time domain signal through inverse fast Fourier transform. The transmission signal vector x outputted from the IFFT section 14 is inputted to a precoding section 15 and precoded using a unitary matrix V. Since weight information of precoding is calculated from a channel matrix of channels, the weight information is reported from the receiver which is the opposite station. The precoded transmission signal vector is subjected to clipping and filtering processing stream by stream in parallel by their respective clipping and filtering sections 16.

Figure 8:
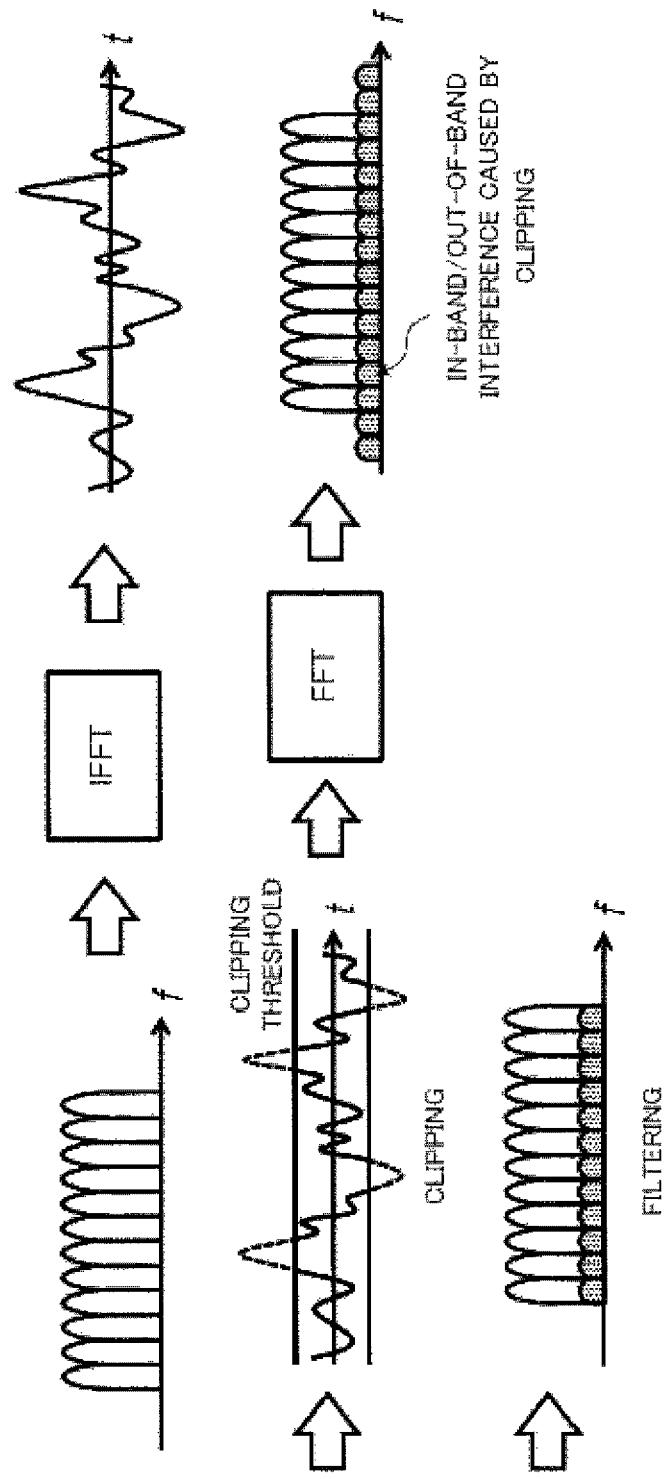
FIG. 8 is a conceptual diagram of clipping and filtering processing on an OFDM transmission signal.

FIG. 8 shows an overview of clipping and filtering processing on an OFDM transmission signal. As shown in FIG. 8, a transmission signal which is data modulated so that transmission data is carried on a plurality of subcarriers is inverse fast Fourier transformed (IFFT) into a time domain signal, and subjected to amplitude clipping whereby a portion exceeding a clipping threshold Pth is cut. After the amplitude clipping, when the precoded signal is fast Fourier transformed (FFT), interference caused by clipping is generated in in-band and out-of-band ranges. The signal is then subjected to filtering processing to remove interference caused by clipping leaking out of the band. The interference caused by clipping remaining in-band is concentrated on streams in a poor state according to the above constraint c).

A repetition processing end determining section 17 determines whether the precoded transmission signal $\hat{x}$ outputted from each clipping and filtering section 16 has converged to a predetermined value or has reached a specified maximum repetition count. Until the transmission signal x^ (peak power) converges to a predetermined value or reaches a default maximum repetition count, the transmission signal x^ is returned to an equivalent stream signal calculation section 18 and the processing via step 4) and step 5) is repeated. When the peak power becomes smaller than a set value or exceeds a maximum value of the set repetition count, the repetition processing is ended and the process moves to the next signal generation processing.

The equivalent stream signal calculation section 18 inputs the clipped and filtered transmission signal x^ and performs a matrix calculation on the transmission signal x^ using V*. That is, the equivalent stream signal calculation section 18 performs the reverse processing of the precoding section 15 to generate an equivalent stream signal on the target stream.

An interference component removing section 19 performs a matrix calculation according to equation (14) on the equivalent stream signal of the target stream calculated by the equivalent stream signal calculation section 18. Equation (14) regenerates the transmission signal x^ of the target stream so as to remove the interference component in streams of stream numbers 1 to $L_{pr}$ in a good state. Furthermore, it is also possible to distribute in-band interference in streams of stream numbers 1 to $L_{pr}$ (see FIG. 8) to streams of stream numbers $L_{pr+1}$ to L in a concentrated manner.

As a result of repeating the above processing, the transmission signal for which the repetition processing end determining section 17 has determined to end the repetition processing is outputted to a CP adding section 21, where a cyclic prefix which becomes a guard band is added thereto. The transmission signal is then transmitted from an RF transmission circuit 22 through each transmitting antenna.

Thus, the present embodiment performs control in specific mode MIMO multiplex transmission so that interference caused by clipping and filtering is concentrated on $(L_{pr+1})$-th to L-th streams, which are streams in a poor state whose capacity reduction by interference is small, and can thereby reduce overall capacity loss.

Next, a PAPR suppression method applicable to frequency selective fading will be described.

Suppose the number of frequency blocks in which different types of fading are observed is B. Suppose a fading variation is constant within each frequency block. Assuming the number of subcarriers per frequency block is K, a frequency domain OFDM transmission symbol vector of the first (1≤l≤L) stream having a length of K is represented by $c_{b,l}$. Assuming that a channel matrix of $N_{rx} \times N_{tx}$ in size in a b-th (1≤b≤B) frequency block is represented by $H_b$, $H_b$ can be decomposed through singular value decomposition as follows.

[Equation 15]

$$H_b = U_b \Lambda_b V_b^H \quad (15)$$

Here, $U_b$ is a unitary matrix of $N_{rx} \times N_{rx}$ in size, $V_b$ is a unitary matrix of $N_{tx} \times N_{tx}$ in size and $\Lambda_b$ is a matrix of $N_{rx} \times N_{tx}$ in size in which each diagonal component is made up of non-negative real numbers representing singular value $\lambda_l$ of the first stream as shown below.

[Equation 16]

$$\Lambda_b = \begin{bmatrix} \Sigma_b & 0 \\ 0 & 0 \end{bmatrix}, \Sigma_b = \mathrm{diag}\{\lambda_{b,l}\} \quad (16)$$

Here $\Sigma E_b$ is a diagonal matrix of $N_{min} \times N_{min}$ in size. $\lambda_{b,l}$ with respect to l which is greater than $N_{min}$ is 0 and furthermore $\lambda_{b,l} \geq \lambda_{b,l+1}$ is also assumed. In a b-th frequency block, the transmitter performs precoding using $V_b$ and the receiver performs linear filtering using $U_b^H$. This allows the MIMO channel to realize specific mode MIMO transmission converted to a total of BL parallel channels.

Transmission power distribution to BL streams based on the water filling principle is performed using $\lambda_{b,l}$. Power allocated to the first stream $p_{b,l}$ is determined as follows.

[Equation 17]

$$p_{b,l} = \left(w - \frac{N_0}{|\lambda_{b,l}|^2}\right)^+ \quad (17)$$

Here, the function $(a)^+$ takes value a when a is a positive number and is 0 when a is a negative number. $N_0$ represents noise power and w is determined so that the total value of $p_{b,l}$ becomes equal to maximum available transmission power. A transmission signal vector $x_{b,l}$ of the first stream after transmission power in the b-th frequency block is controlled is expressed as follows.

[Equation 18]

$$x_{b,l} = \sqrt{p_{b,l}} c_{b,l} \quad (18)$$

Through this transmission power allocation, transmission power may not be allocated to several streams depending on the channel state. In this case, the effective number of streams is smaller than $N_{min}$. Hereinafter, a transmission signal matrix of the b-th frequency block of L×K in size representing a first stream signal transmitted from an i-th (1≤i≤K) subcarrier whose (l, i)-th component is the b-th frequency block is represented as $X_b = [xb, 1 \ldots xb, L]^T$.

When the CF method for PAPR suppression is not applied to the transmission signal, the total channel capacity is as follows.

[Equation 19]

$$c = \frac{1}{B} \sum_{b=1}^{B} \sum_{l=1}^{L} \log_2\left(1 + \frac{|\lambda_{b,l}|^2 p_{b,l}}{N_0}\right)(b/s/H_z) \quad (19)$$

Assuming that $Y_b$ is a transmission signal matrix of $N_{tx} \times K$ in size, the (t,i)-th component of which represents a precoded frequency domain transmission signal of an i-th subcarrier of the b-th frequency block transmitted from the t-th ($1 \leq t \leq N_{tx}$) transmitting antenna, $Y_b$ is given by the following equation.

[Equation 20]

$$Y_b = V_b X_b \quad (20)$$

Hereinafter, suppose $y_{b,t}$ is a t-th row vector of $Y_b$ which is a precoded frequency domain signal vector at the t-th transmitting antenna of the b-th frequency block.

Assuming the number of FFT points is F, a time domain signal vector $z_t$ having a length of F at the t-th transmitting antenna can be expressed as follows.

[Equation 21]

$$z_t = \mathrm{IFFT}_F([y_{1,t} \ldots y_{B,t} 0_{F-BK}]^T) \quad (21)$$

Here, $0_{F-BK}$ is an all-0 vector having a length of F-BK. Measurement of sufficiently accurate peak power requires F to have a value approximately four times BK. By applying the processing using the CF method to $z_t$ causes $z_t$ to be converted to $\tilde{z}_t$. Since clipping and filtering produce an interference signal for peak suppression, $\tilde{Y}_b$ which is $Y_b$ after PAPR suppression using the CF method can be expressed by the following equation.

[Equation 22]

$$\tilde{Y}_b = Y_b + \Delta_b \quad (22)$$

Here, $\Delta_b$ is a matrix of Ntx×K in size representing interference caused by clipping and filtering. This means that the transmission signal $X_b$ before precoding is converted to the following equation.

[Equation 23]

$$\tilde{X}_b = V_b^H \tilde{Y}_b = X_b + V_b^H \Delta_b = X_b W_b$$

$$W_b = [w_{b,1} \ldots w_{b,L}]^T \quad (23)$$

where, $w_{b,l}$ is an interference vector observed in the first stream of the b-th frequency block. Therefore, the total channel capacity can be expressed by the following equation.

[Equation 24]

$$c_{CF} = \frac{1}{B}\sum_{b=1}^{B}\sum_{l=1}^{L}\log_2\left(1 + \frac{|\lambda_{b,l}|^2 p_{b,l}}{|\lambda_{b,l}|^2 E_i[|w_{b,l,i}|^2] + N_0}\right) \quad (24)$$

where, $E_i[|w_{b,l,i}|^2]$ represents a mean value of $|w_{b,l,i}|^2$ with respect to i. Equation (24) indicates that the reduction of channel capacity caused by use of the CF method increases in streams having greater $\lambda_{b,l}$ or greater $p_{b,l}$ in an equivalent term.

As the basic concept, the PAPR suppression method based on the aforementioned CF method is applied to each frequency block. That is, interference power is concentrated on the stream in the worst state in each individual frequency block. Here, suppose the number of streams having $p_{b,l}$ greater than 0 in the b-th frequency block is $L_{\mathit{eff},b}$. In this case, if $L_{\mathit{eff},b}$ is smaller than L, interference caused by clipping and filtering in each stream of the b-th frequency block is concentrated on $L-L_{\mathit{eff},b}$ streams, and it is thereby possible to suppress PAPR without deterioration of channel capacity. When $L_{\mathit{eff},b}$ is equal to L, a certain degree of deterioration of channel capacity needs to be tolerated, but by allocating greater interference power to streams having smaller $\lambda_{b,l}$ or smaller $p_{b,l}$ in an equivalent term, deterioration of the channel capacity can be expected to be reduced compared to the conventional CF method. The present embodiment assumes that when $L_{\mathit{eff},b}$ is equal to L, the $L_{\mathit{eff},b}$-th stream having the smallest $p_{b,l}(\lambda_{b,l})$ is used for PAPR suppression. Summarizing all the observations described above, $L_{pr,b}$ is defined as follows.

[Equation 25]

$$L_{pr,b} = \begin{cases} L_{\mathit{eff},b}, & \text{if } L_{\mathit{eff},b} < L \\ L_{\mathit{eff},b} - 1, & \text{otherwise} \end{cases} \quad (25)$$

Interference caused by clipping and filtering is controlled so as to be concentrated on $L_{pr,b+1}$-th to L-th streams.

The above-described problem with PAPR suppression is expressed as follows taking into account that the problem is applied to frequency selective fading.

[Equation 26]

minimize $P_{max}$ subject to $|\tilde{z}_{t,i}|^2 < P_{max}$, $t=1, \ldots, N_{tx}$, $i=1, \ldots, F$ constraint a')

$u_{t,i} = 0$, $t=1, \ldots, N_{tx}$, $i=BK+1, \ldots, F$, constraint b')

where $u_t = FFT_F(\tilde{z}_t)$ $w_{b,l} = 0$, $b=1, \ldots, B l=1, \ldots, L_{pr,b}$ constraint c') $\quad (26)$ Here, $u_t$ is a vector having a length of F representing a transmission signal sequence in a frequency domain at the t-th transmitting antenna branch after the PAPR suppression. A first constraint a') indicates suppression of peak power, a second constraint b') indicates removal of out-of-band interference. A third constraint c') guarantees that interference is not allocated to the first to $L_{pr,b}$-th streams.

The problem shown in above equation (26) is a convex optimization problem and a solution can be approximately calculated through a repetition algorithm based on consecutive clipping and filtering processing (first and second constraints a' and b') and a repair of the third constraint c').

In the present embodiment, a transmission signal vector after peak suppression is generated according to the following algorithm (steps 1 to 6).

Step 1) Initialization

In initialization, j is assumed to be 1 (j:=1).

A transmission signal $X_b$ is generated from a frequency domain OFDM transmission symbol vector $c_{b,l}$ in the frequency block of the first stream and power allocated to the first stream $p_{b,l}$.

$X_b$ is assumed to be $X\hat{}_b^{(j)}$ ($X\hat{}$ is a replacement of X hat, representing hat{X}, and the same applies to $Y\hat{}$) ($X\hat{}_b^{(j)} := X_b$).

Step 2) Precoding

Precoding is performed using a unitary matrix V ($Y\hat{}_b^{(j)} := V X\hat{}_b^{(j)}$).

Step 3) Clipping and Filtering

A time domain transmission signal $z\hat{}_t^{(j)}$ of the t-th transmitting antenna is generated through IFFT.

[Equation 27]

$$\tilde{z}_t^{(j)} = IFFT_F([\tilde{y}_{1,t}^{(j)} \ldots \tilde{y}_{b,t}^{(j)} 0_{F-BK}]^t) \quad (27)$$

Here, $Y\hat{}_{b,t}^{(j)}$ is a t-th row vector of $Y\hat{}_b^{(j)}$.

Clipping is performed on $z\hat{}_t^{(j)}$ ($t=1, \ldots, N_{tx}$).

Filtering is performed on the clipped signal. According to the present embodiment, filtering for removing out-of-band radiation by clipping can be performed by transforming the clipped time domain signal into a frequency domain signal through FFT and setting the frequency component corresponding to the out-of-band range of the signal to 0.

As a result of the clipping and filtering, $Y\hat{}_b^{(j)}$ is converted to $Y\tilde{}_b^{(j)}$.

$$Y\tilde{}_b^{(j)} = Y\hat{}_b^{(j)} + \Delta_b^{(j)}$$

Step 4) Calculation of Clipped and Filtered Equivalent Stream Signal

For the equivalent stream signal, $X\tilde{}_b^{(j)}$ is calculated ($X\tilde{}_b^{(j)} := V_b^H Y\tilde{}_b^{(j)}$).

Step 5) Removal of Interference Component in Streams of Stream Numbers 1 to $L_{pr,b}$ Interference components in streams of stream numbers 1 to $L_{pr,b}$ are removed according to the following equation.

[Equation 28]

$$\hat{x}_b^{(j+1)} := \begin{bmatrix} I_{L_{pr,b}} & 0 \\ 0 & 0 \end{bmatrix} x_b + \begin{bmatrix} 0 & 0 \\ 0 & I_{L-L_{pr,b}} \end{bmatrix} \tilde{x}_b^{(j)} \quad (28)$$

where, $I_m$ is a unit matrix of m×m in size.

Step 6) Repetition Returning to Step 2)

The above-described process is continued until the peak power becomes sufficiently small or until the repetition count exceeds a maximum allowable value. The $\tilde{Y}_b^{(j)}$ generated in step 3) is actually transmitted in the last repetition.

Figure 9:
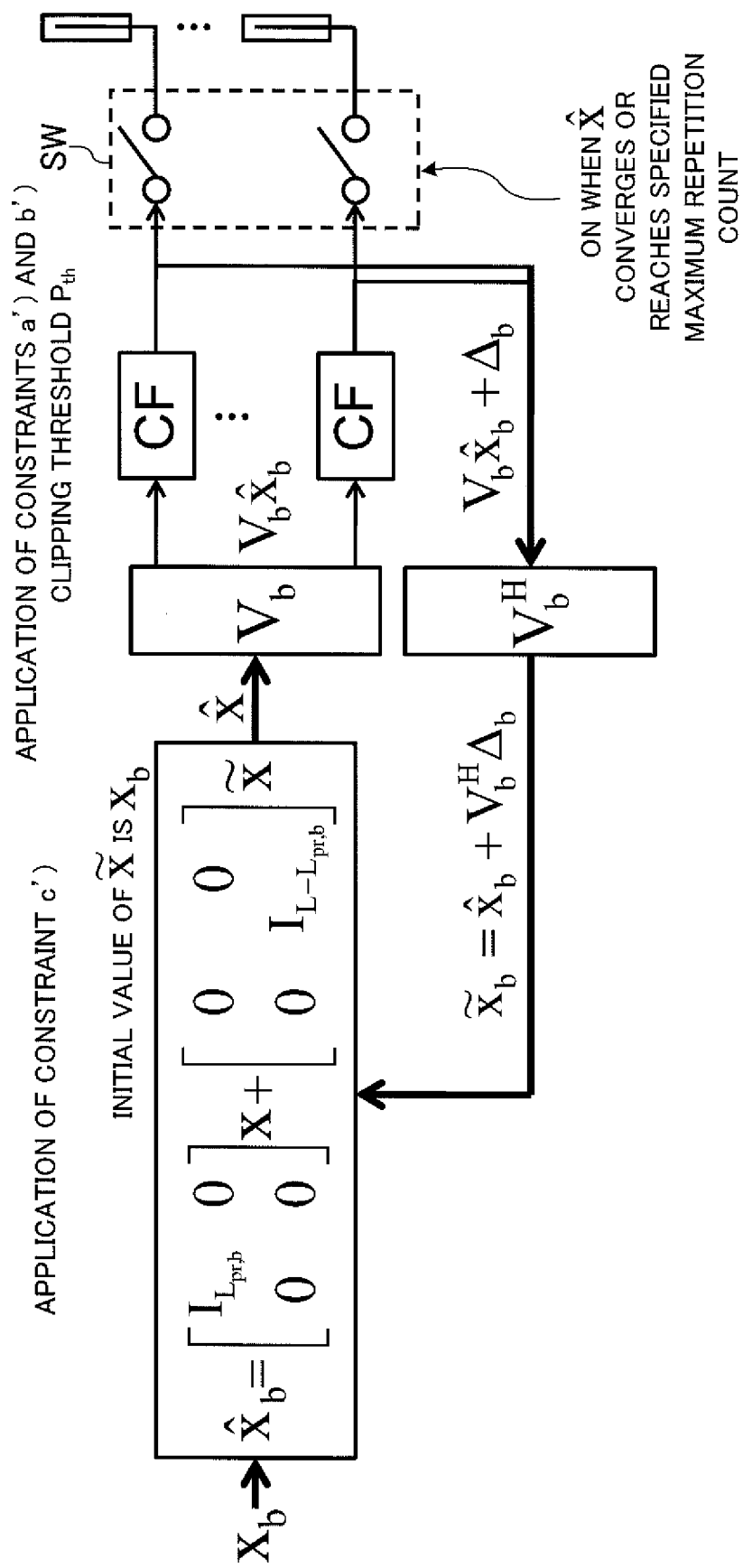
FIG. 9 is a conceptual diagram of a peak suppression method in specific mode MIMO multiplex transmission to which constraints a'), b') and c'), and a repetition algorithm are applied.

FIG. 9 is a conceptual diagram of a peak suppression method in specific mode MIMO multiplex transmission applying the above constraints a'), b') and c'), and a repetition algorithm. As shown in FIG. 9, precoding is performed on a transmission signal vector $\hat{x}_b$ of each individual frequency block using a unitary matrix V of $N_{tx} \times N_{tx}$. Next, amplitude clipping is performed on the precoded signal $V_{bx}\hat{x}_b$ to cut amplitude exceeding a threshold Pth and the out-of-band interference caused by the clipping is then removed using a filter (constraints a') and b')).

By multiplying the clipped and filtered transmission signal vector $V_{bx}\hat{x}_b + \Delta_b$ by $V_b^H$, the clipped and filtered equivalent stream signal ($\tilde{x}_b$) is calculated. To satisfy the constraint c'), the equivalent stream signal ($\tilde{x}$) is substituted into equation (26) to calculate the transmission signal vector $\hat{x}$. According to equation (26), distribution of interference components to streams of stream numbers 1 to $L_{pr,b}$ in a good state in the frequency block is avoided, and interference components are distributed so as to be concentrated on streams of stream numbers $L_{pr,b+1}$ to L in a poor state.

The above processing is repeated and if the transmission signal vector $\hat{x}$ converges or the repetition count reaches a specified count, the switch SW is turned on and the signal is transmitted from the transmitting antenna.

The above-described PAPR suppression method in frequency block units can be realized by the aforementioned function blocks shown in FIG. 7. In the transmitter shown in FIG. 7, the channel coding section 11 applies processing such as error correction to transmission data of a certain frequency block and performs channel coding, the data modulation section 12 applies predetermined data modulation and the serial/parallel conversion section 13 converts a symbol sequence of the resulting transmission data from serial to parallel. The parallel data is inputted to the IFFT section 14 and collectively transformed into a time domain signal through inverse fast Fourier transform. The transmission signal vector $x_b$ outputted from the IFFT section 14 is inputted to the precoding section 15 and precoding is performed using the unitary matrix $V_b$. The signal is precoded using a precoding matrix which differs from one frequency block to another through a frequency selective fading channel. Since weight information on precoding is calculated from a channel matrix of a channel, the weight information is reported from the receiver which is the opposite station. The clipping and filtering sections 16 perform clipping and filtering processing on the precoded transmission signal vector in parallel stream by stream.

Interference caused by clipping remaining in a band for each frequency block is distributed in a concentrated manner to streams in a poor state within the same frequency block according to the above constraint c').

The repetition processing end determining section 17 determines whether or not the precoded transmission signal $\hat{x}$ outputted from each clipping and filtering section 16 has converged to a predetermined value or reached a specified maximum repetition count. The transmission signal $\hat{x}$ is returned to the equivalent stream signal calculation section 18 until the transmission signal $\hat{x}$ (peak power) converges to a predetermined value or reaches a default maximum repetition count and processing in step 4) and step 5) is repeated. When the peak power becomes smaller than a set value or exceeds a set maximum value of the repetition count, the repetition processing is ended and the process moves to the next signal generation processing.

The equivalent stream signal calculation section 18 inputs the clipped and filtered transmission signal $\hat{x}$ and performs a matrix calculation on the transmission signal $\hat{x}$ using $V_b^H$. That is, the equivalent stream signal calculation section 18 performs the reverse processing of the precoding section 15 and generates an equivalent stream signal regarding the target stream.

The interference component removing section 19 performs a matrix calculation according to equation (28) on the equivalent stream signal of the target stream calculated by the equivalent stream signal calculation section 18. Equation (28) regenerates the transmission signal $\hat{x}$ of the target stream so as to remove interference components in streams of stream numbers 1 to $L_{pr,b}$ in a good state in the frequency block. Furthermore, in-band interference in streams of stream numbers 1 to $L_{pr,b}$ (see FIG. 8) may also be distributed in a concentrated manner to streams of stream numbers $L_{pr,b+1}$ to L in a poor state.

As a result of repeating the above processing, the transmission signal for which the repetition processing end determining section 17 determines that the repetition processing is ended is outputted to the CP adding section 21, where a cyclic prefix which becomes a guard band is added thereto. The signal is transmitted from the RF transmission circuit 22 through each transmitting antenna.

The present invention has been described in detail using the aforementioned embodiment, but it is obvious to those skilled in the art that the present invention is not limited to the embodiment described in the present DESCRIPTION. The present invention can be implemented as modified or altered embodiments without departing from the spirit and scope of the present invention defined in the description of the scope of patent claims. Therefore, the description of the present DESCRIPTION is intended to be illustrative and by no means intended to limit the scope of the present invention.

The present application is based on Japanese Patent Application No. 2010-004937 filed on Jan. 13, 2010 and Japanese Patent Application No. 2010-132421 filed on Jun. 9, 2010, entire content of which is expressly incorporated by reference herein.

The invention claimed is:

1. A transmitter comprising:
a transmission data generating section configured to generate transmission data simultaneously transmitted in a plurality of streams;
a precoding section configured to perform precoding so that the transmission data is received by a receiver as data orthogonal to each other;
a peak suppressing section configured to apply amplitude clipping to the precoded transmission data in stream units to suppress peaks of entire transmission power;

a filtering section configured to filter interference power leaking out of the band caused by the amplitude clipping of the peak suppressing section; and an interference allocation controlling section configured to allocate in-band interference power caused by the amplitude clipping to streams in a poor channel state in a concentrated manner, wherein the transmitter transmits, using MIMO multiplexing, the transmission data in the plurality of streams which are spatially multiplexed, according to the allocation of the in-band interference power by the interference allocation controlling section, and each of the plurality of streams has a frequency bandwidth.

2. The transmitter according to claim 1, wherein the interference allocation controlling section allocates the in-band interference power to the streams in a poor channel state based on a repetition algorithm.

3. The transmitter according to claim 2, wherein the interference allocation controlling section comprises a determining section configured to determine an end of repetition processing according to peak power after the peak suppression processing by the peak suppressing section or a repetition count by the repetition algorithm.

4. The transmitter according to claim 1, wherein the precoding section applies one precoding matrix of a plurality of precoding matrixes to each frequency block of a plurality of frequency blocks in a frequency selective fading channel, and the interference allocation controlling section allocates the in-band interference power caused by the amplitude clipping to the streams in a geed poor channel state for each of the frequency blocks.

5. A MIMO multiplex transmission method comprising the steps of:

generating transmission data to be simultaneously transmitted in a plurality of streams;

performing precoding so that the transmission data is received by a receiver as data orthogonal to each other;

applying amplitude clipping to the precoded transmission data in stream units to suppress peaks of the entire transmission power;

filtering interference power leaking out of the band caused by the amplitude clipping;

allocating in-band interference power caused by the amplitude clipping to streams in a poor channel state in a concentrated manner; and transmitting, using MIMO multiplexing, the transmission data in the plurality of streams which are spatially multiplexed, according to the allocation of the in-band interference power, each of the plurality of streams having a frequency bandwidth.

* * * * *